Dec. 15, 1936.    J. J. KUNDIG    2,064,379
FLUID PRESSURE CONTROL SYSTEM
Original Filed Jan. 10, 1931    2 Sheets-Sheet 1
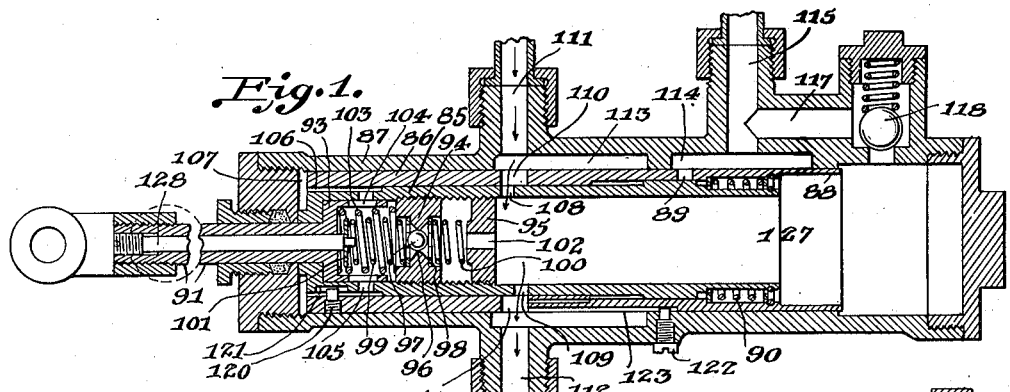
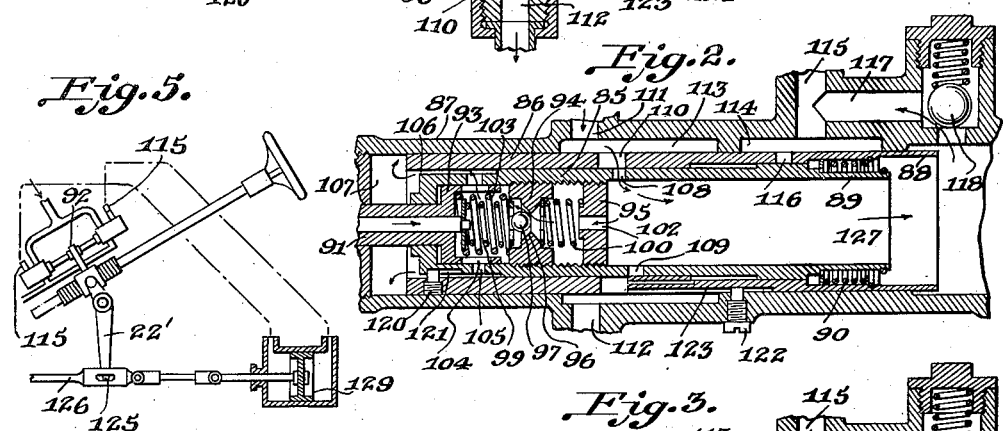
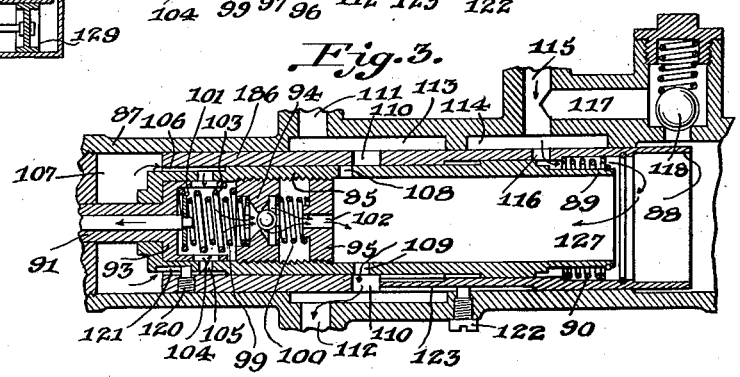
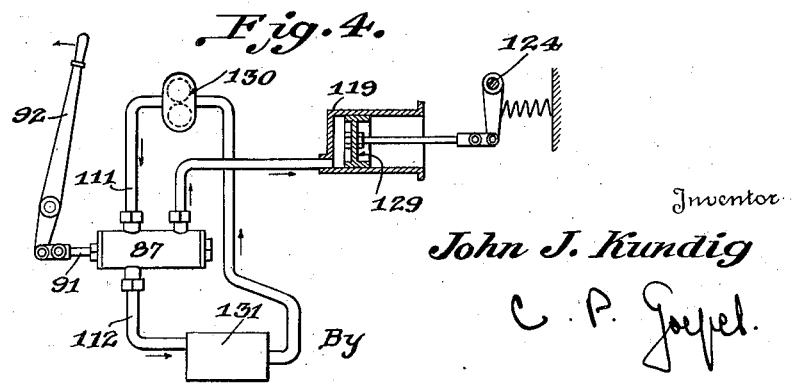
Inventor
John J. Kundig
C. P. Goepel.
By
Attorney Dec. 15, 1936.  J. J. KUNDIG  2,064,379
FLUID PRESSURE CONTROL SYSTEM
Original Filed Jan. 10, 1931  2 Sheets-Sheet 2
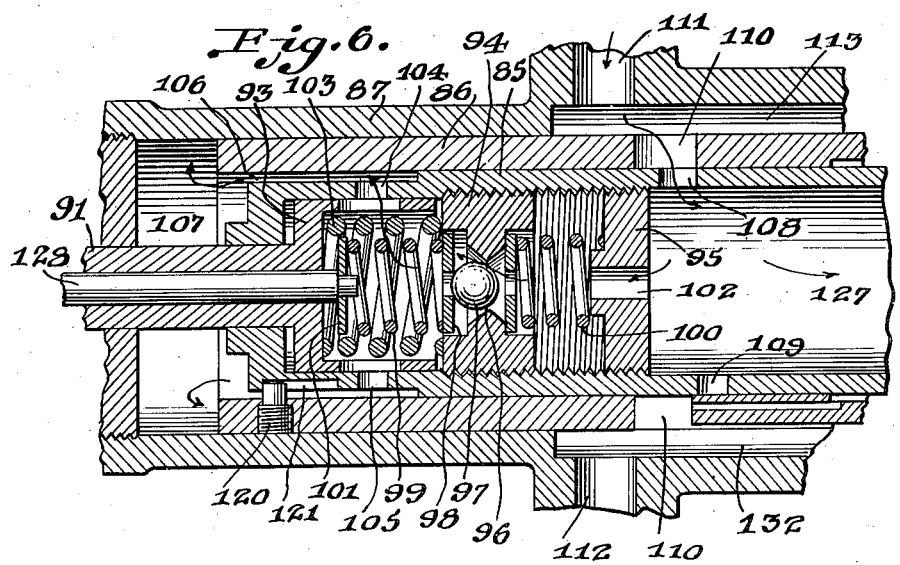
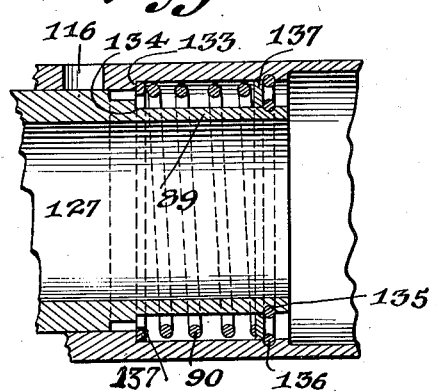
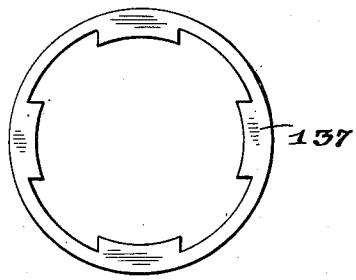
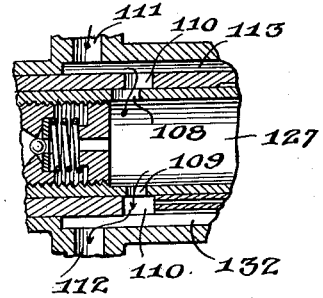
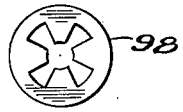
Inventor
John J. Kundig
By
C. P. Goepel,
Attorney Patented Dec. 15, 1936

2,064,379

UNITED STATES PATENT OFFICE 2,064,379

FLUID PRESSURE CONTROL SYSTEM

John J. Kundig, New York, N. Y.

Original application January 10, 1931, Serial No. 507,784. Divided and this application April 4, 1934, Serial No. 718,951

9 Claims. (Cl. 121—38)

My present invention relates to a fluid pressure control system in which a remote fluid motor may be automatically controlled by a manually operated fluid pressure control valve to operate in synchronism therewith and without having any mechanical interconnections for effecting the synchronized follow-up movement.

A further object of this invention is to provide a fluid pressure control valve having a primary and secondary control element and wherein the manual operation of the primary element acts through the intermediate of variating fluid pressures caused by said operation and acting upon to operate the secondary element into open or fluid diverting position and to remain in such position as long as the primary element is being manually operated, whereby the fluid motor is induced to operate in synchronism with the operation of the primary control element.

Another object is to provide means whereby the speed of operation of the fluid motor is maintained in constant synchronism with the speed of the manual operation of the primary element regardless of the load resistance to the fluid motor.

A further improvement consists of means for effecting a retroactive influence which is directly proportioned to the load resistance encountered by the motor and which is to be counteracted by the manual operation, whereby the operator has a cognizance or "feel" of the actual power generated by the motor.

A further purpose of the invention is to provide means, whereby the fluid motor is being locked by enclosed pressure fluid to check reactions which may result from the motor driven mechanism and also to neutralize the retroactive influence upon the manual control means, when the latter are not being actively operated.

In order that the operator may be able to operate the motor connected mechanism by manual power, in case of fluid pressure failure, I may provide an operative connection between the manual control means and the mechanism to be operated, on which, however, the operation of the control valve has no bearing whatsoever.

The invention as hereinafter more fully described and set forth in the subjoined claims is useful for more or less general application to fluid pressure systems and is shown as an exemplification in the accompanying drawings.

In the embodiment as illustrated herein I would preferably use a hydraulic fluid as power medium which is maintained in continuous circulation by a constantly operating pump and in a closed circuit under relatively low pressure. This pressure, however, will build up instantaneously when the fluid flow is being diverted from its normal circuit to actuate the fluid motor and in proportion to the resistance encountered by the latter from the operated mechanism.

The invention, however, I do not consider as limited to the use of a liquid power medium, inasmuch as it will be well understood by those skilled in the art that similar results can be obtained with the improvements as herein disclosed by using any other suitable fluid supply, such as air under pressure for example.

While there is shown and described in detail an embodiment of the invention, it is to be understood that variations in design of the fluid motor, the valve and its elements and the manual control means may be resorted to without departing from the spirit of the invention as expressed in the claims.

This application is a division of my co-pending application Serial No. 507,784, filed Jan. 10, 1931.

In the drawings, in which similar reference characters designate corresponding parts throughout the several views:—

Figure 1 illustrates a longitudinal sectional view of the control valve in a non-operating or neutral position;

Figure 2 illustrates a longitudinal section of the valve and showing the relations between the different elements during a manual operation to the right;

Figure 3 is a longitudinal sectional view of the valve illustrating the different elements in their relations during a manual operation to the left;

Figures 4 and 5 are diagrams showing the control valve in different practical applications in connection with fluid motors.

Fig. 6 shows a portion of the valve as illustrated in Fig. 2, on an enlarged scale;

Fig. 7 is an enlarged view of the valve restoring means in a position as shown in Fig. 1;

Fig. 8 shows a spring washer;

Fig. 9 illustrates a partial longitudinal section of the valve as shown in Fig. 3, with a slight alteration of the port holes; and Fig. 10 shows a washer plate.

In this construction of the control valve there is provided a primary control element or valve sleeve 85 which is slidingly fitted within a secondary valve sleeve 86, the latter in turn being slidingly fitted within the valve casing or housing 87. The outer valve sleeve 86 is internally counterbored at one of its ends as at 88 while the corresponding end of the primary valve sleeve 85 is externally reduced in diameter as at 89. The shoulders 133 and 134 and the compression and expansion rings 135 and 136, respectively, located in grooves of the sleeves, serve as bearing for the spring washers 137. A compression spring 90, surrounding this end of the sleeve 85 and located between the spring washers 137, urges the sleeves in relatively opposite directions, and tends to yieldingly retain the latter in a normal neutral position. A relative sliding movement of the sleeves in either direction away from said neutral position will therefore compress said spring 90.

The other end of the inner valve sleeve 85 is closed, and a hollow operating rod or stem 91 connected with the manually operable member, such as the lever 92, is movable therethrough, the end of said rod within the valve sleeve 85 carrying a hollow head 93 slidably fitted within the valve sleeve. In spaced relation to this closed end of the valve sleeve, a collar 94 is threaded therein, a second collar 95 being also threaded in said valve sleeve and spaced from the collar 94. The latter collar has a central orifice 96 which is normally closed by a valve ball 97 movable through said orifice to either side thereof. Washer plates 98 positioned in the recessed side faces of the collar 94 have parts engaging the valve ball 97 and are respectively held yieldingly by springs 99 and 100 against relative movement to retain the valve ball 97 in its normal position closing the orifice 96 and thereby forming the opposite relative and independent fluid pressure chambers 107 and 127. The other end of the spring 99 is seated against a collar or washer plate 101 fixed to the rod 128 projecting from the inner side of the head 93, while the other spring 100 is seated at its other end against the collar 95. This collar is provided with a central opening 102 therethrough. The compression of the spring 99 may be regulated by the threaded portion of the rod 128 and the compression of the spring 100 is adjustable by the threaded collar 95.

The ball valve 97 presents a double acting check valve to regulate the fluid pressure differential between the chambers 107 and 127, such differential being directly proportioned to the tensions of the springs 99 and 100. The spring 99, thereby, acts to check the fluid pressure from the chamber 107, which results in a similar effect as that obtained if two independent single and oppositely acting spring pressed check valves, were employed. Presuming that the tensions of the respective springs 99 and 100 are properly preadjusted to thereby effect a proportion of fluid pressure differential, between the two chambers which is of the proper ratio to the thereto exposed opposite face areas of the secondary sleeve 86, such fluid pressures will have a balancing effect to hold the sleeve 86 in cooperation with the spring 90 in a neutral or non-diverting position.

The distance between the collar 94 and the closed end of the valve sleeve 85 is slightly greater than the length of the head 93, and a relatively strong coil spring 103 surrounds the spring 99 and yieldingly resists the initial movement of the head 93 relative to the valve sleeve. The wall of this head is provided with openings 104 therethrough in constant communication with the ports 105 in the wall of the valve sleeve 85. This end of the valve sleeve is externally reduced in diameter so as to provide the passage 106 affording communication between the interior of the head 93 through openings 104 and ports 105 and the chamber 107 between the end of the outer valve sleeve and the closed end of the valve casing 87.

At the inner side of the collar 95, the wall of the valve sleeve 85 is provided at diametrically opposite sides of said valve with the port holes 108 and 109 respectively, which are out of alignment with each other, said port holes in the normal position of the valve sleeves respectively registering with the relatively large port holes 110 in opposite sides of the secondary valve sleeve 86. Thus from reference to Fig. 1, it will be understood that in this normal position of the valve sleeves, the pressure fluid has an unobstructed passage from the supply inlet 111 through the primary and secondary valve sleeves to the return connection 112. The supply connection 111 is in communication with the internal longitudinally extending slot or chamber 113 formed in the valve casing, while the return connection 112 communicates with the longitudinal extending slot 132. At one side of said valve casing in spaced relation from the chamber 113, the internal passage 114 is provided in the wall thereof in communication with the outlet connection 115, and with said passage the port 116 in the wall of the sleeve 86 is in constant communication. The outlet 115 is also connected by the by-pass 117 with the interior of the valve casing beyond the end 88 of the valve sleeve 86 and which is part of the chamber 127, such communication being normally closed by a spring seated valve 118. The spring which presses upon the ball valve 118 has for its sole purpose to insure proper seating of the latter and to prevent its rolling off when the control valve is in another position than horizontal, for example, such as that shown in Fig. 5. Other means, such as a guide for the ball may serve the same purpose. The outlet 115 is connected with one end of the piston cylinder 119.

The valve sleeve 85 is held against rotation relative to the sleeve 86 by the screw 120 threaded in the wall of the latter sleeve and having its inner end engaged in a slot or groove 121 formed in the outer surface of the valve sleeve 85. Similarly, a screw 122 threaded in the wall of the valve casing has its inner edge engaged in the slot or groove 123 in the valve sleeve 86 to prevent rotative movement of the latter sleeve relative to the wall of the casing.

In the manual operation of the control valve, as illustrated in Fig. 2, the primary control element or valve sleeve 85 is being shifted toward the right within the secondary sleeve 86, and thereby acts as a plunger or piston between the chambers 107 and 127 and will cause a variation of the fluid pressure proportion between said two chambers by primarily producing a vacuum in the chamber 107, since the orifice 96 is closed by the spring pressed valve 97 which withstands a predetermined magnitude of vacuum influence in proportion to the preadjusted tension of spring 99. The balancing effect will be destroyed and thereby effect a small initial movement of the secondary valve sleeve 86 in the opposite direction toward the left, at the same time compressing the spring 90. The initial shifting movement of the sleeve 86 towards the left causes a partial restriction of the orifice 109, whereby offering a resistance to the continuous flow of the fluid from the supply line 111 to the return line 112 which results in an instantaneous increase of fluid pressure in the chamber 127. The check valve 118 will thereby be opened to admit the pressure fluid to the cylinder 119.

Such increased fluid pressure will also act upon the righthand face areas of the sleeve 86, tending to further shift the latter towards the left relative to the sleeve 85 and against the tension of spring 90.

Upon continuation of the initial operating speed of the sleeve 85, the increase of volume of the chamber 107 will be compensated by the inflowing fluid from the chamber 127 to thereby maintain the established fluid pressure differential between the chambers 107 and 127, presuming that the capacities of the springs 99 and 103 are in correct proportion to thereby properly meter said inflowing fluid.

If the manual operating speed of the rod 91 is maintained constant and the load resistance upon the piston 129 remains constant, the fluid pressure in chamber 127 will also remain constant. The sleeve 86 will then follow the movement of sleeve 85 towards the right by the fluid pressure influence upon its relatively bigger lefthand area. Obviously the area of the restricted port 109 will remain constant during the unitary movement of the sleeves 85 and 86 with the result that a constant amount of pressure fluid will be diverted upon the piston 129 and effecting the latter to operate at a constant speed in proportion to the manual operating speed of the rod 91.

Assuming that the uniform operation of the rod 91 is continued and the sleeves 85 and 86 shift in unison therewith towards the right and the load resistance upon the piston 129 should, for example, increase, then the fluid pressure in the chamber 127 will obviously increase also. Such increase of fluid pressure acting against the right end face area of the sleeves 86 and 85 will tend to shift the latter to the left relatively to the head 93 and compress the spring 103. The movement of sleeve 86 will be retarded and further shifted towards the left upon the sleeve 85, thereby further compressing the spring 90. The port 109 will be further restricted to thereby automatically regulate the passage area for the fluid under increased pressure and whereby the amount of diverted fluid upon the cylinder 119 is maintained constant, resulting in constant operating speed of the piston 129.

In the movement of sleeve 85 relatively to the head 93, the spring 99 will also be further compressed, resulting in a bigger opposition of ball valve 97 to the increased fluid pressure in chamber 127 and thereby regulate the effective passage area of orifice 96 for the compensating fluid entering the chamber 107, thereby automatically changing the fluid pressure differential between the chambers 107 and 127 to maintain the sleeve 86 in its assumed position relative to the sleeve 85 in its travel towards the right under increased supply fluid pressure.

It will be understood that upon a substantial increase of fluid pressure in chamber 127, the fluid pressure in chamber 107 will also increase, although never reaching the potentiality of the fluid pressure in chamber 127. A difference of fluid pressures between the two chambers, during the operation of the valve, will always exist in proportion to the tension of spring 99. Since said variation of the fluid pressure differential is caused by the volumetric changes of the capacity of chamber 107, I may obtain any desired sensitiveness of the secondary sleeve 86 responding to the manual operation of the sleeve 85 by enlarging the outside diameter of the sleeve 85 to thereby increase its volume, or by reducing the outside diameter of the sleeve 86 to thereby reduce its face area which is exposed to the chamber. A small shifting movement of the relatively big body of the sleeve 85 will therefore result in an instantaneous and big shifting movement of the secondary sleeve 86. This presents a highly desirable feature of the control valve, as practically no lost motion for overlapping the port holes will be perceived. Thereby the resulting rapid restriction of the port 109 of the inner valve sleeve wall will tend to cut off the flow of the pressure fluid to the return connection 112. Thus pressure builds up instantly within the chamber 127 and overcomes the slight resistance of the ball valve 118 to act through the intermediate of conduit 115 upon the piston within the cylinder 119.

Obviously the pressure of the continuously inflowing hydraulic fluid will automatically adjust itself to the load resistance encountered by the piston 129 and therefore be directly proportional to the power output of the latter. Since the right end face of the sleeve 85 together with the right end surface of the collar 95 and the collar 94, are exposed to the actuating fluid pressure, such fluid pressure will counteract the manual shifting movement of the sleeve 85 and thereby impress the desired proportional "feel" of the fluid pressure variations within the motor 119 upon the lever or other manually operable part 92.

As shown in Fig. 2 of the drawings, the pressure fluid within the chamber 127 also has free passage through the opening 102 and acts against the valve ball 97 to move the same in one direction against the action of the spring 99 so that the pressure fluid may pass through the orifice 96, openings 104 and ports 105 and thus enter chamber 107.

If the primary sleeve 85, by an initial manual operation of the control rod 91, is moved to the right at a slow rate of speed, the pressure variation between the two chambers will be little, since the vacuum created by augmenting the volume of chamber 107 will be low and in proportion to the tension of the relatively weak spring 99, as the pressure exerted from the manual control rod 91 upon the spring 99 will obviously be low at slow operating speed. The ball valve 97, in its throttling effect upon the fluid passing through orifice 96 will thereby regulate the amount of compensating fluid flowing into chamber 107 in a given time period to thereby maintain said vacuum in proportion to the speed of manual operation. The secondary sleeve 86 will thereby be shifted only a short distance against the resistance of the spring 90 and oppositely relative to the initial movement of the sleeve 85 and thereby only partly obstructing the orifice 109. Part of the pressure fluid from the continuous supply entering through conduit 111 will then pass through orifice 109 and to the discharge 112, while the other part will be forced through conduit 115 to actuate the piston 129 at a relatively slow rate of speed. Upon continued slow operation of the sleeve 85, the sleeve 86 will remain in its assumed and relative position thereto and move in unison therewith under the influence of the pressure fluid entering from the opposite chamber 127 and thereby maintain said partial obstruction of the orifice 109 with the result that the piston 129 will maintain its slow actuating speed in synchronism with the slow manual operation of the control rod 91.

If the primary sleeve 85 is being operated towards the right at a higher rate of speed, there will then be a bigger variation of the fluid pressures between the chambers 107 and 127. The compensation of the more rapid initial increase of volume in chamber 107, by the fluid entering through orifice 96, will be more delayed in a given time period due to the inertia of the inflowing fluid which results in a bigger shifting movement of sleeve 86 towards the left and a bigger restriction of the port 109.

The resulting higher fluid pressure in chamber 127 will also shift the primary sleeve 85 towards the left relatively to the head 93 and compress the spring 103 together with the spring 99 whereby to increase the throttling effect of the valve 97 upon the inflowing compensating fluid to adjust the vacuum in proportion to the higher speed of manual operation. Thereby the resulting bigger or full obstruction of the port 109 will effect the diversion of a bigger or of the whole amount of pressure fluid supply upon the piston 129 and cause the latter to move at a higher rate of speed and in synchronism with the speed of the manually operated rod 91.

The retroactive effect upon the sleeve 85 from the increasing fluid pressure within the chamber 127 resulting from the restriction or obstruction of the port 109 and caused by the above described operations will tend to retard the movements of the sleeve 85 relatively to the movements of the operating rod 91, and respectively of the head 106, due to the movable relation therebetween and the sleeve 85 which results in a compression of the spring 103 carried by the head 106. The pressure of the spring 103 is preadjusted by the threaded collar 94 to allow maximum sliding movement of the head 106 relative to the sleeve 85 upon a maximum fluid pressure reaction thereupon from chamber 127. The spring 99 which is carried by means of the washer plate 101 and the rod 128 and in fixed relation to the head 106, is compressed in unison with the spring 103 and thereby increases its pressure influence upon the ball valve 97 through the washer plate 98 and in direct proportion to the fluid pressure in chamber 127, thereby controlling the opening of the orifice 96, through which the compensating pressure fluid passes, inversely proportional to the fluid pressure in the chamber 127.

The relative positions which the different elements have assumed during the above described operation are more clearly shown in Fig. 6, which is an enlarged illustrated view of a part of Fig. 2.

The effective area of the orifice 96 through which the pressure fluid may pass is therefore automatically metered or adjusted by the influence of spring 99 upon valve 97 that the quantity of fluid entering chamber 107 during a given time period and a given speed of operation remains constant regardless of the magnitude of fluid pressure in chamber 127, thus maintaining a constant relative proportion of fluid pressures in the chambers 107 and 127 to keep the secondary valve sleeve 86 in its assumed operating position during a continued shifting movement of the primary control element 85.

In the operation of the control valve the maximum sliding movement of the secondary sleeve 96 relative to the primary sleeve 85 is limited by the stop 112 engaging one end of the channel or groove 121 and only sufficient to cut off communication between the chamber 127 and the return connection 112. During such movement of the inner valve member and the further follow-up movement of the outer valve member, communication between the passage 114 and the interior of the valve member 85 is closed by the wall of the valve member 85 closing the port 116.

Due to the effect of the check valve 97 caused by the proportionate compression of its spring 103, the fluid pressure in the chamber 107 during the operation of the valve to the right, will always be proportionately lower than the fluid pressure in the chamber 127. The retroactive influence upon the manually operated primary element 85 will therefore always be towards the left or against the latter's movement, such effect being markedly increased by the substantially bigger face area of the combined elements 85, 94 and 97 which are exposed to the fluid pressure in chamber 127 as against the opposite face area of the sleeve 85 which has a smaller outside diameter and is further reduced by the cross area of the operating rod 91.

The substantially bigger face area of the secondary sleeve 86 which is exposed to the chamber 107 insures an effective operation towards the right and against the fluid pressure influence in chamber 127 upon its right end face area which is markedly smaller due to the enlarged inside diameter of the pressure exposed sleeve.

Concurrently with the stopping of the manual shifting of the sleeve 85 to the right, the fluid pressure flowing from chamber 127 through the orifice 96 and into chamber 107 will act upon the left side face of the secondary valve sleeve 86 to further shift the latter in cooperation with the spring 90 towards a neutral position. Due to the checking effect of the valve 97 caused by the spring 99 against the flow of the pressure fluid from chamber 127 to chamber 107, the fluid pressure in chamber 127 will drop slightly below the fluid pressure in chamber 107 during a further opening of the passageway through ports 109 and 110. Thus the resulting slight pressure differential between the two chambers in cooperation with the pressure effect of the valve centering spring 90 will finally shift the sleeve 86 to a position relative to sleeve 85 as indicated in Fig. 1, and reestablish a neutral or non-diverting position.

When the manually operable primary control element 85 is moved in the opposite direction additional pressure is produced in chamber 107, by the reduction of the latter's volume, thus destroying the balance of the fluid pressure upon and forcing the outer valve sleeve 86 in the reverse direction and until port 116 is uncovered by the inner valve sleeve and port 109 of said valve sleeve is in registering relation with the lower port 110 in the outer sleeve and in communication through chamber 132 with the return connection 112. Thus, as seen in Fig. 3 of the drawings, the pressure fluid may now freely pass from the cylinder 119 through the connection 115, passage 114 and around the reduced end 89 of the inner valve sleeve into chamber 127 and hence through port 109 to the return connection 112. The amount of travel of the sleeve 86 relative to sleeve 85 which determines the quantity of pressure fluid admitted to chamber 127 from the line 115 through port 116, is again directly proportional to the speed at which the primary valve is being operated. A slow initial movement of the sleeve 85 towards the left will obviously effect a slow volumetric decrease of the chamber 107 and a relatively slight increase of fluid pressure therein since the pressure fluid may escape through the orifice 96 by pressing the ball valve 97 towards the right against the small resistance of spring 100. Thereby the effected variation of fluid pressure influence upon the sleeve 86 in the chamber 107, will therefore no more be counterbalanced by the relatively lower fluid pressure influence thereupon in chamber 127 with the result that the sleeve 86 will be forced towards the right against the compression of spring 90 and thus partly open communication between the conduit 115 and the chamber 127 through the port 116.

A continued operation of the sleeve 85 towards the left and at the assumed slow rate of speed will maintain the fluid pressure in chamber 107 constant with the result that the sleeve 86 will be moved towards the left in its assumed position relative to and in unison with the sleeve 85 by the pressure influence of spring 90. The effective area of passage which is thereby uncovered of the port 116 will also remain constant which results in a constant flow of pressure fluid from the conduit 115 to the discharge 112 and of a relatively low capacity. The piston 129 will therefore be moved in an opposite direction by the load resistance and at proportionate speed or in synchronism with the speed of the manually operated sleeve 85.

It will be understood that a more rapid operation of the sleeve 85 towards the left will produce a relatively higher fluid pressure in the chamber 107 due to the greater volume of pressure fluid to be thus forced through the orifice 96. The thereby assumed position of sleeve 86 relative to sleeve 85 will cause a bigger opening of port 116, permitting the piston 129 to force a bigger amount of pressure fluid to the discharge conduit 112 in the same time period and, therefore, again operate in synchronism with the more rapidly moving primary control element 85. The communication between the ports 108 and 110 is shut off during the operating position. Should the control valve be used in conjunction with a single acting actuator such as illustrated in Fig. 4, the port 108 would then be sufficiently enlarged to maintain free passage of the pressure fluid from the supply 111 to the return 112 during the discharge period, as illustrated in Fig. 8. In such relative movement of the valve sleeves as last explained, the spring 90 is of course placed under compression.

Upon an arresting of the manual shifting operation of sleeve 85 in the reversed direction, the secondary valve sleeve 86 will be quickly shifted to the left and towards neutral position by the influence of the spring 90 which also forces by its action some of the fluid pressure in chamber 107 against the relatively small resistance of ball valve 97 and through the orifice 96 into chamber 127, thereby re-establishing the balancing effect of the fluid pressures in the chambers 107 and 127 upon the secondary valve sleeve 86 which again resumes a neutral position relative to sleeve 85 as shown in Fig. 1 of the drawings.

From the foregoing it will be understood that if the capacities of the divers springs are properly proportioned to the respective pressure areas and the different parts are properly fitted, the function of the elements, as described, will occur in instantaneous succession during the different operations with the result of a quick response of the secondary control element 86 to the manual operation of the primary control element 85.

It will be noticed that the outlet or feed connection 115, respectively the port 116 and valve 118 are closed during a neutral position of the valve, whereby back pressures from the actuated mechanism upon the working cylinder 119 are effectively checked by the enclosed fluid pressure in said cylinder. A retroactive influence from the pressure condition in the power cylinder and upon the manually controllable valve sleeve 85 is, therefore, possible only during an active manual operation of said sleeve 85.

The valve as described may be used for controlling the fluid pressure effect upon a single or one-way acting fluid motor or piston cylinder such as indicated in Fig. 4 of the drawings. Such a device may, for example, be applied to automotive vehicles for the operation of the brakes, the piston in the single acting cylinder 119 being operatively connected with the load shaft 124 of the brake mechanism. Of course, it will be understood that a foot actuated pedal may be substituted for the hand lever 92 shown in the figure. Normally when the brakes are not applied or when maintained stationary in an applied position and the valve mechanism is in neutral position, there is a free and unobstructed continuous circulation of the hydraulic fluid medium between the continuously operating pump 130 and the supply tank 131, the pump being driven through a suitable connection by the vehicle engine.

By altering the construction and without departing from the spirit of the present invention, the valve may be variously modified to have a double acting effect upon the fluid pressure diversion or I may apply two valves of the illustrated type for controlling the fluid pressure effect upon two single and oppositely acting or a double acting actuator. In Fig. 5, I have illustrated an exemplary arrangement, wherein two of the control valves are employed in conjunction with a steering mechanism of an automotive vehicle, the primary control elements of the valves being actuated by the manually operated steering post. In this case, a double-acting power cylinder may be employed as shown in Fig. 5, of which the opposite ends are connected with the outlets 115 of the respective valves. The steering lever 22' in this case has a lost-motion connection such as that indicated at 125 with the operating connections or drag link 126 between the actuator and the steering linkage or other part to be actuated. The lost-motion may be cushioned by suitable oppositely acting springs located in the enlarged portion of the part 126.

The sole purpose of the steering lever 22' is to transmit manual power which can be added to the power of cylinder 119 or to operate the steering mechanism by sole manual power in case of fluid pressure supply failure.

Due to the fact that the control valve as described herein, operates to open or fluid diverting position upon an initial movement of the manually operable control member and remains in such open position during a continued mobile manual operation, and to close automatically and simultaneously with the stopping of the manual control, the mechanism or actuator to be actuated by the diverted fluid pressure will be caused to operate in perfect synchronism with the movements of the manual operating means. In other words, a predetermined linear motion in one direction of the control rod 91 will automatically cause a predetermined and relative movement of the piston 129 in the power cylinder 119, which represents a remote control system for synchronous fluid pressure actuation without mechanical interconnections for follow-up movement.

While I have thus disclosed two different applications of the described embodiment of the control valve, it will be apparent that the device might also be incorporated in various other arrangements and applied to numerous different uses.

I claim:

1. In a fluid pressure control valve having a normally closed communication with a fluid motor, supply and exhaust ports, a supply of pressure fluid, a housing, a movable element in said housing forming a pair of independent and relatively opposite fluid pressure chambers, a movable valve element for controlling the flow of said pressure fluid and having relatively opposite portions exposed to the fluid pressures in said opposite chambers, and manual control means for moving said movable element to vary the volume of and thereby the fluid pressure differential in said chambers whereby to operate said valve element to divert said pressure fluid to said motor.

2. In a fluid pressure control valve, a valve casing having a supply port, a discharge port and a normally closed feed port communicating with a fluid motor, a supply of pressure fluid, an oppositely closed cylinder in said casing and having a movable element to form a pair of independent and relatively opposite fluid pressure chambers, a normally neutral positioned valve element for controlling said port and having relatively opposite portions exposed to the fluid pressures in said opposite chambers, manual control means for moving said movable element to effect a differential of fluid pressures between said chambers whereby to operate said valve element into an operating position to divert pressure fluid to said motor, means whereby to subject one of said chambers to the pressure influence of the motor actuating fluid pressure to thereby effect a retroactive influence against the movement of said movable element in direct proportion to the motor power, a fluid passage between said two chambers and a spring pressed valve for controlling the flow of pressure fluid through said passage and means whereby also to subject the spring of said valve to said retroactive influence to control the area of said passage in proportion to said actuating fluid pressure and thereby control said fluid pressure differential in proportion to the power required to operate said manual control means, said spring pressed valve acting to admit pressure fluid from the actuating fluid pressure subjected chamber to the opposite chamber for balancing the pressures therebetween to thereby cause said valve element to move to neutral position concurrently with the stopping of said manual operation.

3. In a fluid pressure control valve having an oppositely closed housing, a movable valve element normally held in a non-operating position by resilient means, a plunger in said housing forming a pair of independent and relatively opposite fluid pressure chambers therein, said valve element having relatively opposite portions exposed to said opposite chambers, a supply of pressure fluid, normally open supply and exhaust ports, a normally closed communication between the control valve and a fluid motor, manual control means for moving said plunger whereby to change the volume of and thereby to effect a fluid pressure differential between said chambers to thereby move said valve element into operating position whereby to restrict the effective passage area of said exhaust port in proportion to said differential and to divert an amount of pressure fluid to actuate said motor, a fluid passage connecting said chambers, a spring pressed valve for controlling the flow of compensating pressure fluid through said passage to maintain said differential constant and to thereby maintain said valve element in said operating position during a continued operation of said manual control means at constant speed whereby also maintaining said exhaust port area restriction and the amount of diverted motor actuating fluid constant to cause said motor to operate at a speed proportional to the operating speed of said manual control means, means whereby to subject one of said chambers to the pressure influence of the motor actuating fluid pressure to thereby control the operating position of said valve element, and means whereby to subject the spring of said passage controlling valve to the pressure influence of the motor actuating fluid pressure for restricting said passage in proportion to said actuating fluid pressure to thereby also control said differential and the obstruction of said exhaust port in proportion to the resistance encountered by said motor.

4. In a fluid pressure control valve having an oppositely closed housing, a movable valve element normally held in a non-operating position by resilient means, a plunger in said housing forming a pair of independent and relatively opposite fluid pressure chambers therein, said valve element having relatively opposite portions exposed to said opposite chambers, a supply of pressure fluid, normally open supply and exhaust ports, a normally closed communication between the control valve and a fluid motor, manual control means for moving said plunger whereby to change the volume and thereby effect a fluid pressure differential between said chambers to thereby move said valve element into operating position whereby to restrict the effective passage area of said exhaust port in proportion to said differential and to divert an amount of pressure fluid to actuate said motor, a fluid passage connecting said chambers, a spring pressed valve for controlling the flow of compensating fluid through said passage to maintain said differential constant and to thereby maintain said valve element in said operating position during a continued operation of said manual control means at constant speed whereby maintaining said exhaust port restriction and the amount of diverted motor actuating fluid constant to cause said motor to operate at a speed proportional to the operating speed of said manual control means, means whereby to subject one of said chambers to the pressure influence of the motor actuating fluid pressure to thereby effect a retroactive influence against the manual operation of said plunger which is proportional to the motor power and to control the operating position of said valve element and means whereby to subject the spring of said passage controlling valve to said retroactive influence for restricting said passage and thereby control said differential and the restriction of said exhaust port in proportion to said motor actuating fluid pressure.

5. In combination, a fluid motor connected with a part to be actuated, a supply of pressure fluid and a control valve for said supply having a valve casing, a supply port, an exhaust port and a normally closed motor feed port, a movable plunger in said casing forming a pair of independent and relatively opposite fluid pressure chambers, a valve element movable under the influence of the fluid pressure differential between said two chambers, manual control means to move said plunger whereby to vary the volumes of said chambers and thereby also vary the fluid pressure differential to operate said valve element into an operating position whereby tending to close said exhaust port and to divert an amount of pressure fluid for actuating said motor, a fluid passage between said chambers having a spring pressed valve for controlling the flow of compensating fluid through said passage to maintain said differential constant during a constant manual operating speed of said plunger to thereby divert a constant amount of pressure fluid causing said motor to operate at constant speed in proportion to the manual operating speed, means for subjecting one of said chambers and thereby one side of said valve element to the motor actuating fluid pressure influence for also controlling the operating position of said valve element in proportion to said actuating fluid pressure, means for subjecting the spring of said passage controlling valve to the motor actuating fluid pressure influence whereby controlling said differential and the operating position of said valve element during a continued manual operation of said plunger and in proportion to the motor actuating fluid pressure and operative connections with lost motion between said manual control means and said motor connected part for manually operating the latter in case of fluid pressure supply failure.

6. In a fluid pressure control valve having a movable valve element, an oppositely closed cylinder and a primary control element slidingly fitting therein and forming a pair of independent and opposite relative fluid pressure chambers, said valve element having opposite relative face areas directly subjected to the influence of the fluid pressure in the correspondingly opposite chamber, said valve element having normally a neutral or non-fluid diverting position under the balanced influence of the fluid pressures in said chambers, manual operating means for shifting said primary control element to cause variations of fluid pressure in said chambers and thereby effecting a movement of said valve element to operating position, and valve means responsive to the fluid pressures in said chambers and incorporated with said primary control element for automatically effecting a return movement of said valve element to neutral position and under the influence of the supply fluid pressure and to re-establish said balanced influence simultaneously with the stopping of the manual shifting operation.

7. A fluid pressure control valve, a valve casing having supply, discharge and feed ports, said feed port communicating with a part to be actuated, a supply of fluid pressure, a movable valve element, an oppositely closed cylinder having a primary control element slidingly fitted therein and forming a pair of independent and relative opposite fluid pressure chambers, said valve element having relative opposite face areas directly subjected to the influence of the fluid pressure in the correspondingly opposite chambers, said valve element having normally a neutral position effected by the balanced influence of the fluid pressures in said chambers and by resilient means, manual operating means for shifting said primary control element in one direction to cause variations of fluid pressure in said independent chambers and thereby effecting a movement of said valve element into a position to direct the pressure fluid from said supply port to said feed port and to cause an actuation of said part, and means influenced by said actuating fluid pressure for counteracting the manual operation of said primary control element in direct proportion to the power required for actuating said part, and means responsive to the fluid pressures in said chambers and incorporated with said primary control element for automatically effecting a return movement of said valve element to neutral position and under the influence of said supply fluid pressure and said resilient means to re-establish said balanced influence simultaneously with the stopping of the manual shifting operation, said valve element being operated in an opposite direction from said neutral position by the reversely unbalanced fluid pressure influence to thereby open communication between said feed port and said discharge port upon a reversed manual operation of said control member.

8. A fluid pressure control valve, a valve casing having a supply, discharge and feed port, said feed port communicating with a part to be actuated, a supply of fluid pressure, a movable valve element in said casing, an oppositely closed cylinder having a primary control element slidingly fitting therein and forming a pair of independent and relative opposite fluid pressure chambers, said movable valve element having relative opposite face areas exposed to the influence of the fluid pressures of the corresponding chambers, said face areas and the fluid pressures in said chambers having such correlation to effect a balancing influence upon said valve element and to thereby hold the latter in cooperation with resilient means normally in a neutral or non-fluid diverting position, manual operating means operatively connected to shift said control element and to thereby produce a variation of fluid pressures in said chambers acting to move said valve element into a position to direct the pressure fluid from said supply port to said feed port for actuation of said part, means directly influenced by said actuating fluid pressure to impress a retroactive influence against the manual shifting of said control element by varying the fluid pressure in the chamber located oppositely to the shifting movement in said direction and in direct proportion to the power required for said part actuation, and a passageway in said control element connecting said opposite chambers, a valve movable in two directions and carried by said control element and having opposite faces exposed to the fluid pressures in the corresponding opposite chambers, springs acting oppositely upon and tending to hold said valve in a position to close said passageway, means for directly subjecting one of said springs to said retroactive impression which is applied upon the manual operating means, whereby the flow of pressure fluid between said chambers is automatically regulated to maintain the fluid pressures in said chambers constantly proportional to said first produced variation of pressure during a continued manual operation of the control element in said direction at constant speed and under constant pressure resistance, and said valve acting to automatically vary the fluid pressures in said chambers to restore said balancing influence and to thereby effect an operation of said valve element in an opposite direction and to neutral position concurrently with the stopping of the manual operation, and said valve element being further operated beyond said neutral position by a reversed variation of fluid pressures in said chambers during a reversed manual operation of said control element to thereby open communication between said feed port and said discharge port.

9. In a fluid pressure control valve having an oppositely closed housing, a movable valve element normally held in a non-operating position by resilient means, a movable element forming a pair of independent and relatively opposite fluid pressure chambers in said housing, said valve element having relatively opposite portions exposed to said opposite chambers, a supply of continuously circulating pressure fluid, normally open supply and exhaust ports, a normally closed communication between the control valve and a fluid motor, manual control means for moving said movable element whereby to change the volume of and effect thereby a fluid pressure differential between said chambers to move said valve element into operating position whereby restricting the effective passage area of said exhaust port in proportion to said differential and to divert an amount of pressure fluid to said motor, a fluid passage connecting said chambers, a spring pressed valve for controlling the flow of compensating pressure fluid through said passage to maintain said differential constant and to thereby maintain said valve element in said operating position during a continued operation of said manual control means at constant speed whereby maintaining said exhaust area restriction and the amount of diverted pressure fluid upon said motor also constant to cause the latter to operate at a speed proportional to the operating speed of said manual control means.

JOHN J. KUNDIG.